US007539671B2

(12) United States Patent
Fukuda et al.

(10) Patent No.: US 7,539,671 B2
(45) Date of Patent: May 26, 2009

(54) IMAGE PROCESSING APPARATUS, IMAGE FORMING APPARATUS, METHOD FOR SEARCHING PROCESSED DOCUMENT, PROGRAM FOR SEARCHING PROCESSED DOCUMENT, AND RECORDING MEDIUM

(75) Inventors: Takao Fukuda, Yamatokoriyama (JP); Atsuo Tanaka, Nabari (JP); Hirokazu Izumi, Nara (JP); Toshihiko Sugimura, Kashiwara (JP)

(73) Assignee: Sharp Kabushiki Kaisha, Osaka (JP)

( * ) Notice: Subject to any disclaimer, the term of this patent is extended or adjusted under 35 U.S.C. 154(b) by 530 days.

(21) Appl. No.: 11/193,366

(22) Filed: Aug. 1, 2005

(65) Prior Publication Data
US 2006/0023235 A1 Feb. 2, 2006

(30) Foreign Application Priority Data
Aug. 2, 2004 (JP) ............................. 2004-225978

(51) Int. Cl.
*G06F 17/30* (2006.01)
*G06F 7/00* (2006.01)
*G06F 17/00* (2006.01)
*G06F 17/21* (2006.01)

(52) U.S. Cl. ............................. 707/3; 707/6; 715/201; 715/243

(58) Field of Classification Search ....................... None
See application file for complete search history.

(56) References Cited

U.S. PATENT DOCUMENTS

| 5,787,414 A | 7/1998 | Miike et al. | |
|---|---|---|---|
| 5,933,823 A * | 8/1999 | Cullen et al. | 707/6 |
| 6,014,679 A * | 1/2000 | Tomioka et al. | 715/201 |
| 6,574,616 B1 * | 6/2003 | Saghir | 707/1 |
| 6,650,794 B1 * | 11/2003 | Aoki | 382/306 |
| 6,718,333 B1 | 4/2004 | Matsuda | |
| 2002/0078098 A1 * | 6/2002 | Shirai | 707/517 |
| 2003/0076539 A1 * | 4/2003 | Nakajima | 358/2.1 |

FOREIGN PATENT DOCUMENTS

| JP | 6-348758 A | 12/1994 |
|---|---|---|
| JP | 07-093208 | 4/1995 |
| JP | 09-237282 | 9/1997 |
| JP | 2000-029902 | 1/2000 |

\* cited by examiner

*Primary Examiner*—Twyler L Haskins
*Assistant Examiner*—Barbara D Reinier
(74) *Attorney, Agent, or Firm*—Birch, Stewart, Kolasch & Birch, LLP

(57) ABSTRACT

An image processing apparatus of the present invention includes: an appearance data generating section 21 for generating appearance data according to a drawing appearance of a processed document; a classification information producing section 22 for producing, from the appearance data, classification information for classifying the processed document; a data file save processing section 23 (saving section) for saving in a storage section a data file of the processed document together with the classification information of the data file; an appearance information inputting section 15 (inputting section) for inputting the appearance information of the processed document desired by a user; an appearance information converting section 29 for converting the appearance information into classification information to output the classification information; and a searching section 26 for searching the storage section 26 to find the data file of the processed document consistent with the outputted classification information. This enables the user to search the processed document easily and quickly to reuse it.

19 Claims, 10 Drawing Sheets

FIG. 6 (a)
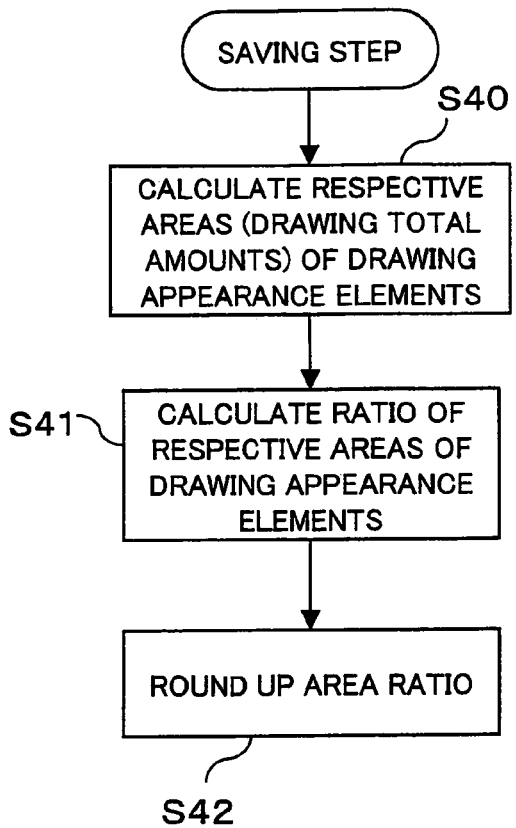
FIG. 6 (b)
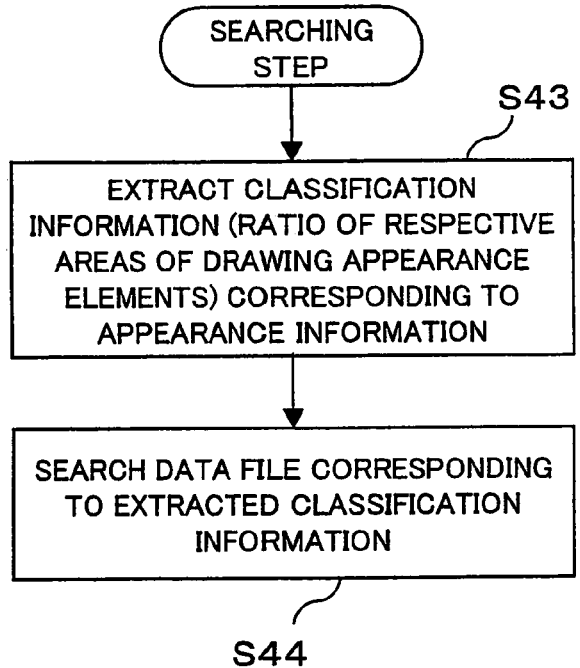
FIG. 7
| TEXT, TABLE/GRAPH, AND PICTURE ARE SAME IN AREA | (4,4,4)(5,3,4)(3,5,4)(5,4,3)... |
|---|---|
| TEXT ONLY | (12,0,0)(11,1,0)(11,0,1)(10,1,1)... |
| TEXT IS LARGE IN AREA | (6,3,3)(6,2,4)(6,4,2)(7,3,2)... |
| TEXT IS SMALL IN AREA | (2,5,5)(2,4,6)(2,6,4)(1,5,6)... |
| NO TEXT | (0,6,6)(1,5,6)(1,6,5)(2,5,5)... |
| PICTURE ONLY | (0,12,0)(1,11,0)(0,11,1)(1,10,1)... |
| PICTURE IS LARGE IN AREA | (3,6,3)(2,6,4)(4,6,2)(3,7,2)... |

IMAGE PROCESSING APPARATUS, IMAGE FORMING APPARATUS, METHOD FOR SEARCHING PROCESSED DOCUMENT, PROGRAM FOR SEARCHING PROCESSED DOCUMENT, AND RECORDING MEDIUM

This Nonprovisional application claims priority under 35 U.S.C. § 119(a) on Patent Application No. 2004/225978 filed in Japan on Aug. 2, 2004, the entire contents of which are hereby incorporated by reference.

FIELD OF THE INVENTION

The present invention relates to a system for searching a document processed by an image processing apparatus.

BACKGROUND OF THE INVENTION

In a field of image processing apparatuses, such as a section 9, an image formation controlling section 25, an appearance data generating section 21, a classification information generating section 22, a data file save processing section 23 (saving section), a user identifying section 24, an appearance information converting section 29, a searching section 26, and a search result processing section 28. Moreover, the image processing section 9 includes (i) a copy processing section 10 having a region separation processing section 31, (ii) a scan processing section 12 having a region separation processing section 33, and (iii) a print processing section 13 having a PDL analyzing section 35.

The user interface 4 includes a processing user information inputting section 19 and a search condition inputting section 11. The search condition inputting section 11 includes an appearance information inputting section 15 and a searching user information inputting section 17.

The following explains the above-described sections.

The image inputting section 2 reads out a document by, for example, a CCD, and then outputs an image data (analog data) of the document to the copy processing section 10 or the scan processing section 12 in the image processing section 9. A document read out by the image inputting section 2 at a time is hereinafter referred to as a processed document (a plurality of documents read out by the image inputting section 2 consecutively are hereinafter referred to copy machine, a printer, a scanner, a fax machine, a multifunction printer, etc., a technique has been recently proposed in which a document (processed document), which has been processed once, is stored as a data file to reuse it later.

FIG. 11 is a flow chart showing a procedure of a conventional method for searching a processed document (see Japanese Unexamined Patent Publication 237282/1997 (Tokukaihei 9-237282, published on Sep. 9, 1997)). As shown in FIG. 11, a user first prepares an image of a model document (Step 202). That is, the user selects the following (i) through (iii) which are similar to a document the user wishes to search: (i) the type of a document, (ii) the pattern of a body of the document, and (iii) the layout of a title, a graphic, and the body, from a model document image menu on a user interface screen. In the model document image menu, the type of the document has the following particulars: newspaper, character, business letter, journal/magazine, catalogue/pamphlet, and handwriting. As the pattern of the body, the number of column settings of the document body is three, i.e., 1 column to 3 columns. The layout of the title, the graphic, and the body has the following particulars: (i) a layout in which the title is above the body and the graphic, (ii) a layout in which the title is above the body, and (iii) a layout in which the title is above the graphic.

Then, information concerning characteristics of the model document image prepared in Step 202 is obtained (Step 204). Based upon the obtained information concerning characteristics of the model document image (by using the obtained information as a key), a search is carried out with respect to a database which stores the processed documents to find a document similar to the model document image (Step 206). In order to find out whether the model document image and a searched image (image of the processed document) are similar to each other or not, a result obtained by analyzing textures of those images is used. That is, the similarity between the model document image and the searched image is checked by (i) extracting characteristic vectors of the model document image and the searched image as the information concerning characteristics of those images, and (ii) applying distance technique (Euclidean distance technique, for example) to the characteristic vectors. The characteristic vector includes 80 components. The first 20 components are prepared according to a histogram concerning the sizes of connected components in each image. The second 20 components are prepared by measuring substantial portions in each image. The third 20 components are prepared according to a vertical projection histogram concerning the connected components. The last 20 components are prepared by dividing each image into 20 cells and then obtaining the total number of connected components in each cell. Note that when finding out whether the model document image and the searched image are similar to each other or not, it is possible to combine the result (texture data) obtained by analyzing the textures of the images with a result (character data) of optical character recognition (OCR).

When the search is completed, a document image similar to the model document image is displayed as a search result (Step 208). The document image displayed here is one document which is most similar to the model document image, or cluster icons of a plurality of documents similar to the model document. In the case in which the document found in the search of Step 208 is not the desired processed document, the displayed document image or an arbitrary document in the cluster icons may be specified as a new model document image, and then the process returns to Step 206. In this way, it becomes possible to search the desired processed document again.

However, according to the above-described conventional method, the user has to prepare a model document, which is annoying. Especially, in the case in which it is difficult to convert the desired processed document into the model document (it is difficult to appropriately make choices from the menu on the user interface screen), the user has no other choice but to give up the search or repeat the search over and over again.

SUMMARY OF THE INVENTION

The present invention was made in view of the above problems, and an object of the present invention is to provide an image processing apparatus which allows a user to easily search a processed document to reuse it.

In order to solve the above problems, an image processing apparatus of the present invention is characterized by including: an appearance data generating section for generating appearance data according to a drawing appearance of a processed document; a classification information producing section for producing, from the appearance data, classification information which is for classifying the processed document; a saving section for saving a data file of the processed document in a storage section together with the classification information of the data file; an inputting section to which appearance information of the processed document desired by a user is inputted; an appearance information converting section for converting the appearance information into the classification information and then outputting the classification information; and a searching section for searching the storage section to find the data file of the processed document consistent with the outputted classification information.

According to the above arrangement, the appearance data generating section generates the appearance data based on the drawing appearance of the processed document. Here, the drawing appearance of the processed document is a drawing form or a drawing state of the processed document. The drawing form or the drawing state is exemplified by a form or a state of the processed document which includes many characters (texts) but no photographs or pictorial diagrams, a form or a state of the processed document which includes many tables and/or graphs, etc.

Moreover, the classification information producing section produces the classification information of the processed document from the appearance data. This classification information is information for classifying the processed document according to the drawing appearance of the processed document. Moreover, the saving section saves in the storage section the data file of the processed document together with the classification information of the data file.

Moreover, the inputting section receives an input concerning the appearance information of the processed document desired by the user. This appearance information is a user's rough memory (user's image concerning the appearance of the processed document) concerning the drawing appearance of the processed document. One example is that there are many characters (texts) but no photographs or pictorial diagrams.

Moreover, the appearance information converting section converts the appearance information into the classification information, and then outputs the classification information. In this way, the user's memory of the drawing appearance of the processed document is converted into the information for classifying the processed document according to the drawing appearance.

Moreover, the searching section searches the storage section to find the data file of the processed document consistent with the classification information supplied from the appearance information converting section. In this way, it becomes possible to pick up the data file of the processed document desired by the user.

Thus, according to an image processing apparatus of the present invention, the user can pick up the data file of the desired processed document only by inputting the rough memory of the drawing appearance of the processed document. Therefore, it is possible to search the processed document easily and quickly as compared with a conventional search system in which a model document is prepared and then the processed document is searched according to the model document.

BRIEF-DESCRIPTION OF THE DRAWINGS

FIG. 4($b$) is a flow chart showing steps of searching the processed document in the multifunction printer.

FIG. 6($a$) is a flow chart showing details of part of the saving steps. FIG. 6($b$) is a flow chart showing details of part of the searching steps.

FIG. 7 is a conversion table for converting appearance information into classification information, the appearance information being inputted by a user.

Figure 8:
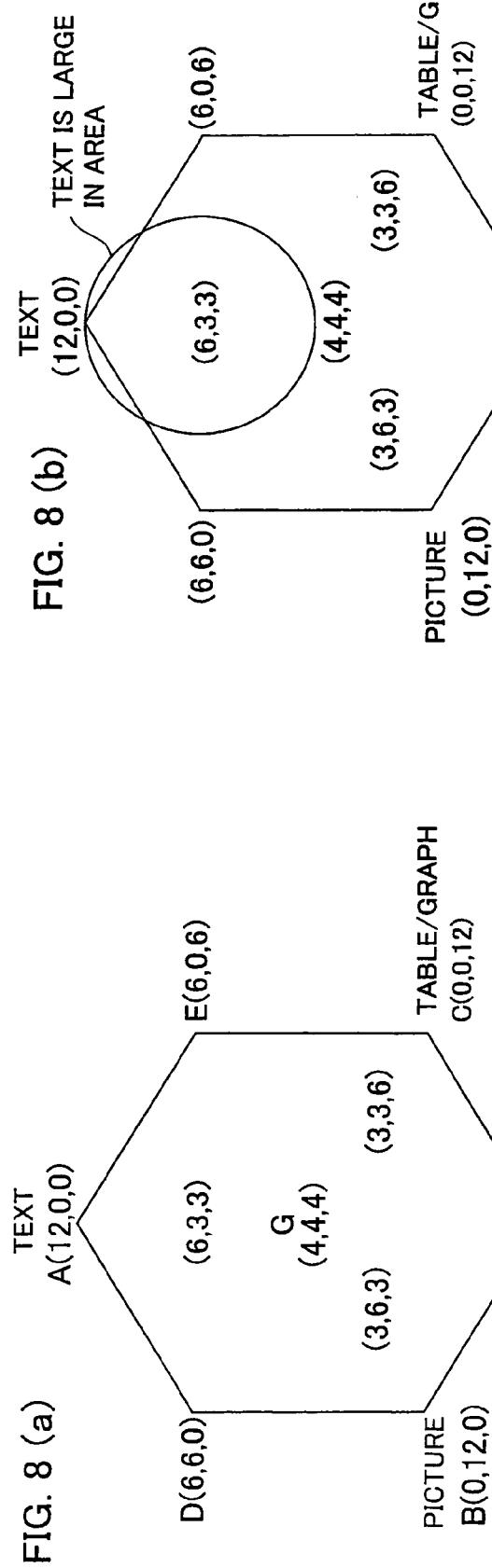

FIGS. 8($a$) to 8($c$) are schematic diagrams showing an arrangement of a screen of an appearance information inputting section in the multifunction printer.

Figure 9:
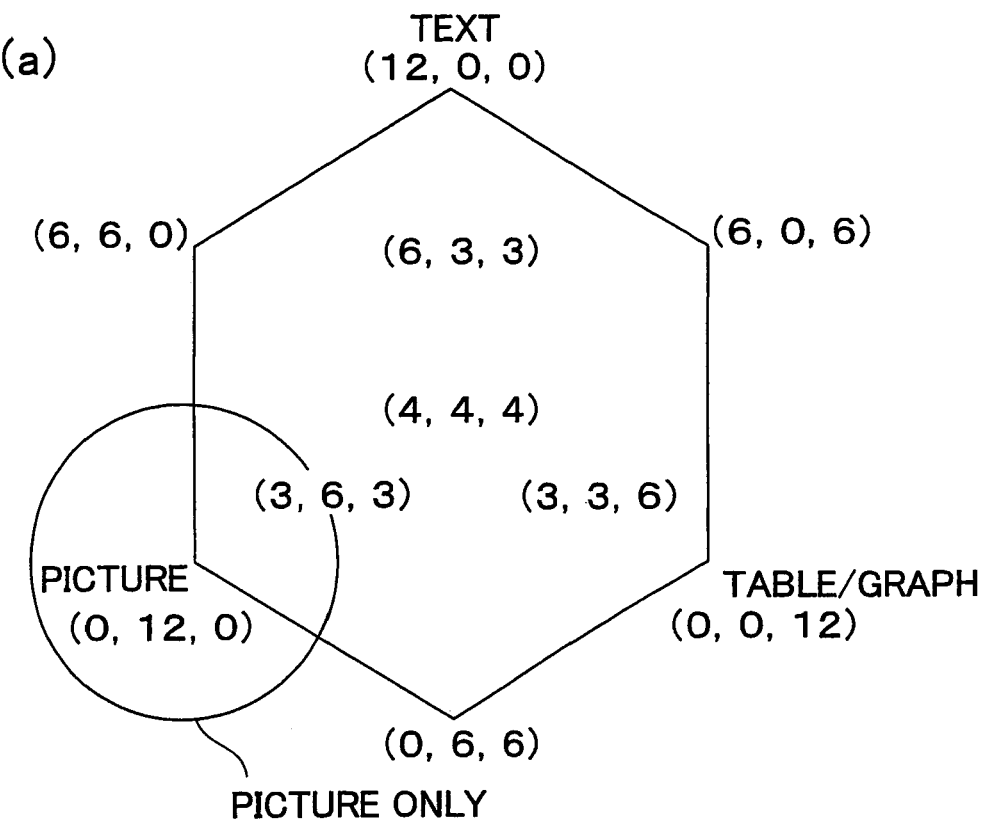
Figure 9:
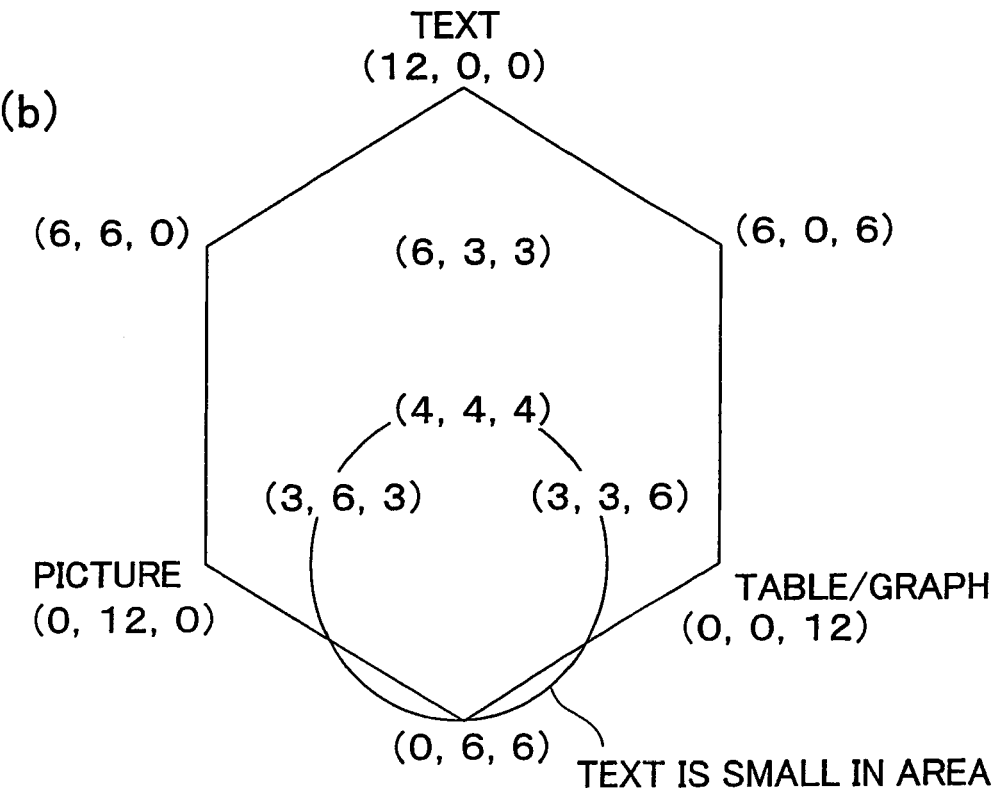

FIGS. 9($a$) and 9($b$) are schematic diagrams showing an arrangement of the screen of the appearance information inputting section in the multifunction printer.

Figure 10:
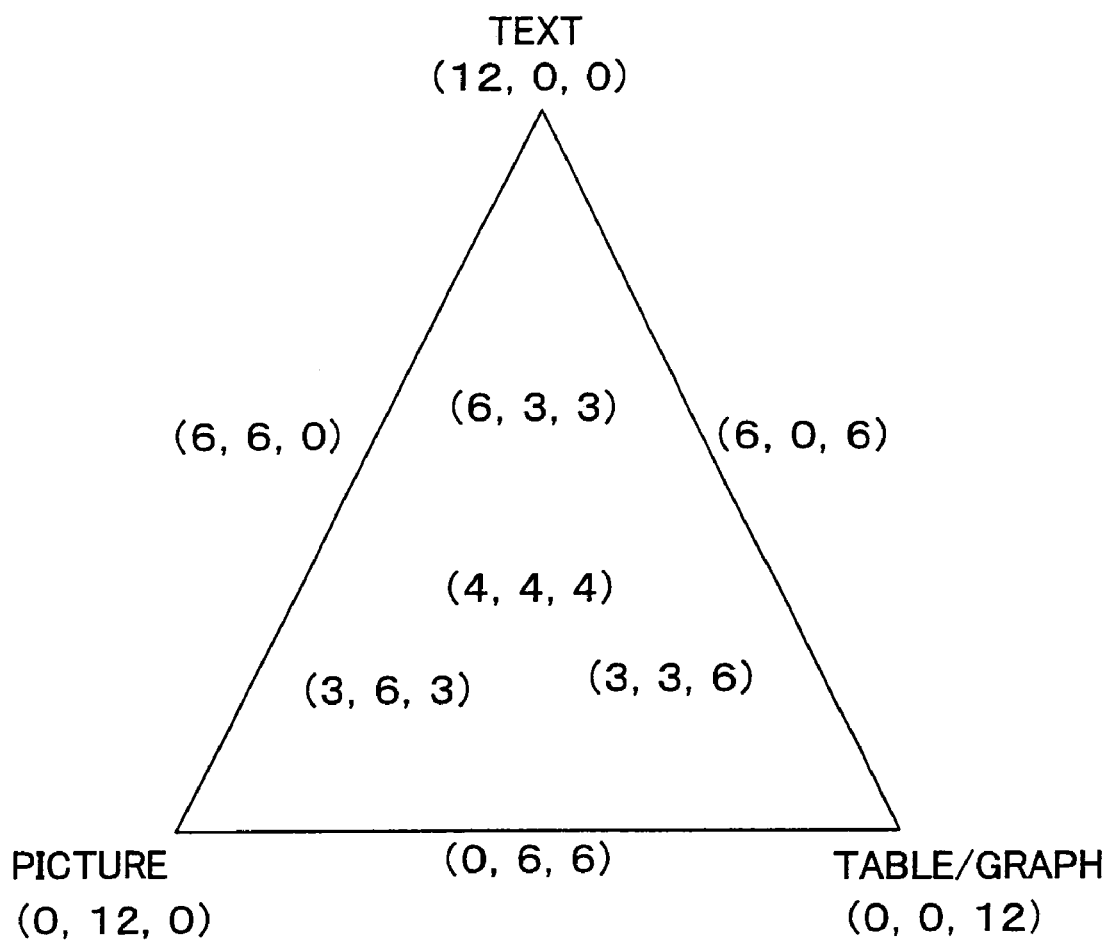

FIG. 10 is a schematic diagram showing another arrangement of the screen of the appearance information inputting section.

Figure 11:
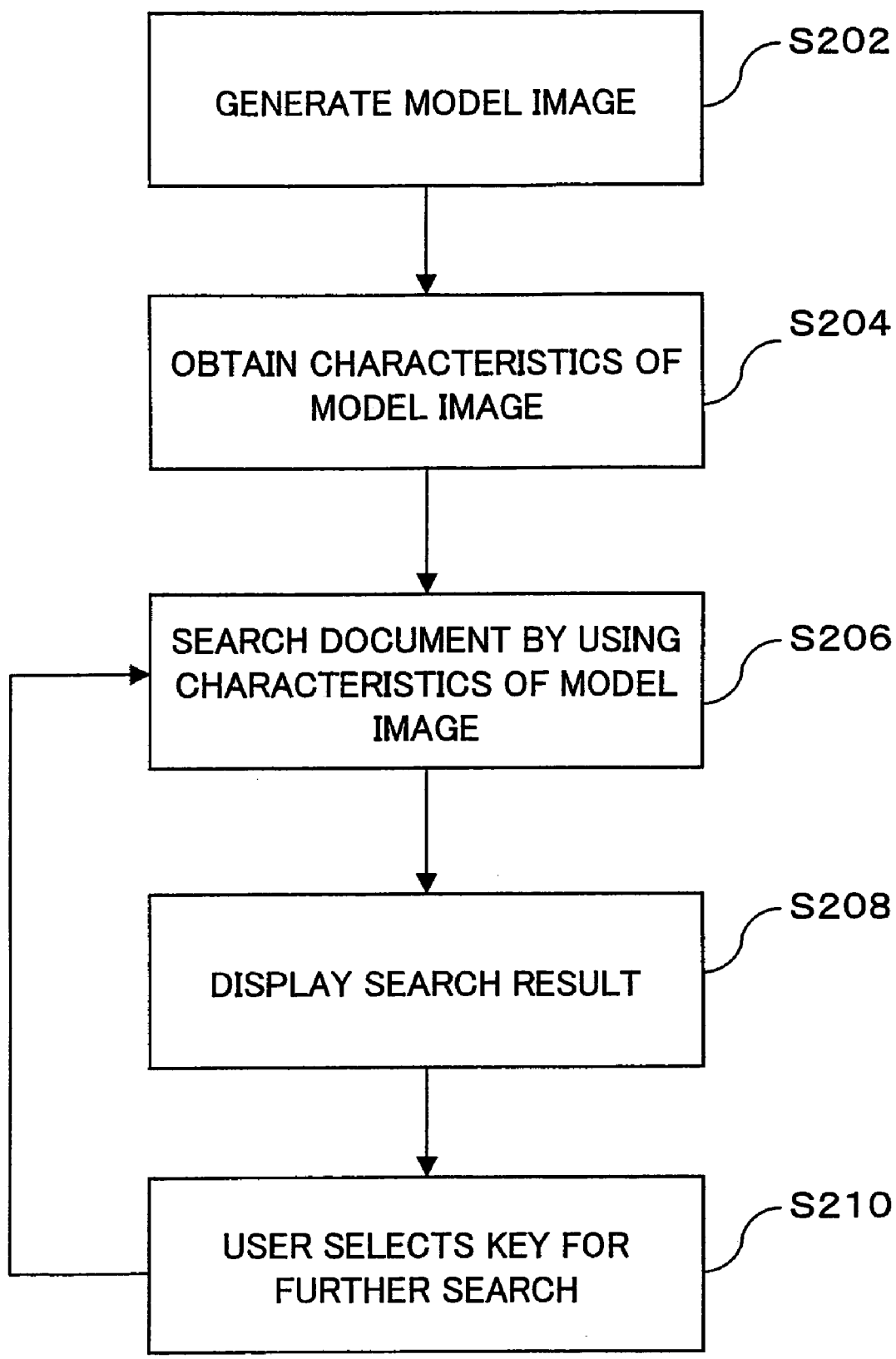

FIG. 11 is a flow chart showing a conventional method for searching a document.

DESCRIPTION OF THE EMBODIMENTS

The following explains one embodiment of the present invention in reference to FIGS. 1 to 10.

A multifunction printer 1 of the present embodiment is a multifunction printer having at least the following functions of copying, printing, and scanning. The multifunction printer 1 is arranged so that a user can easily search a document (processed document), which has been processed once, to reuse it.

Figure 1:
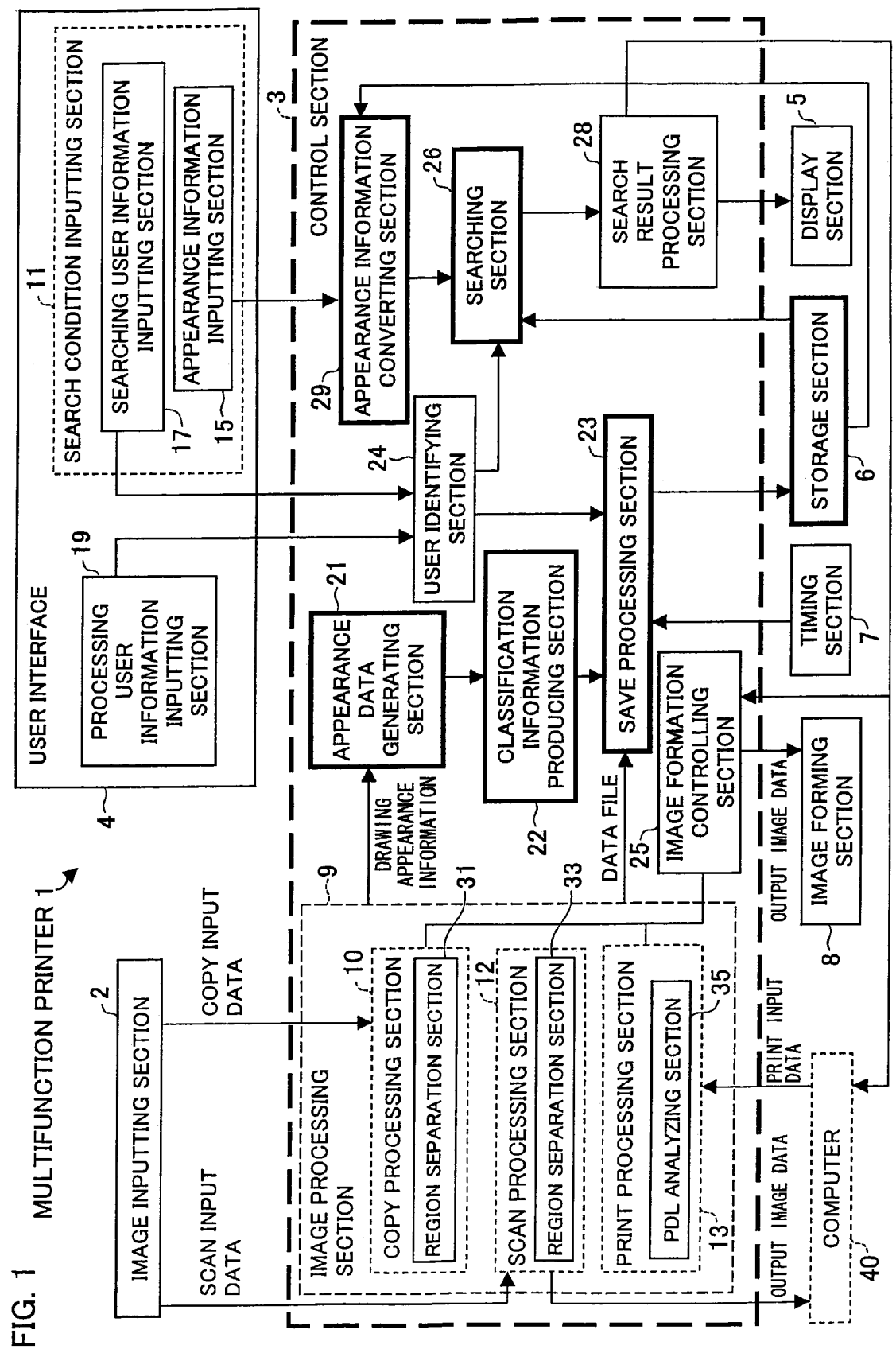
FIG. 1 is a block diagram showing an arrangement of a multifunction printer of the present invention.
Figure 2:
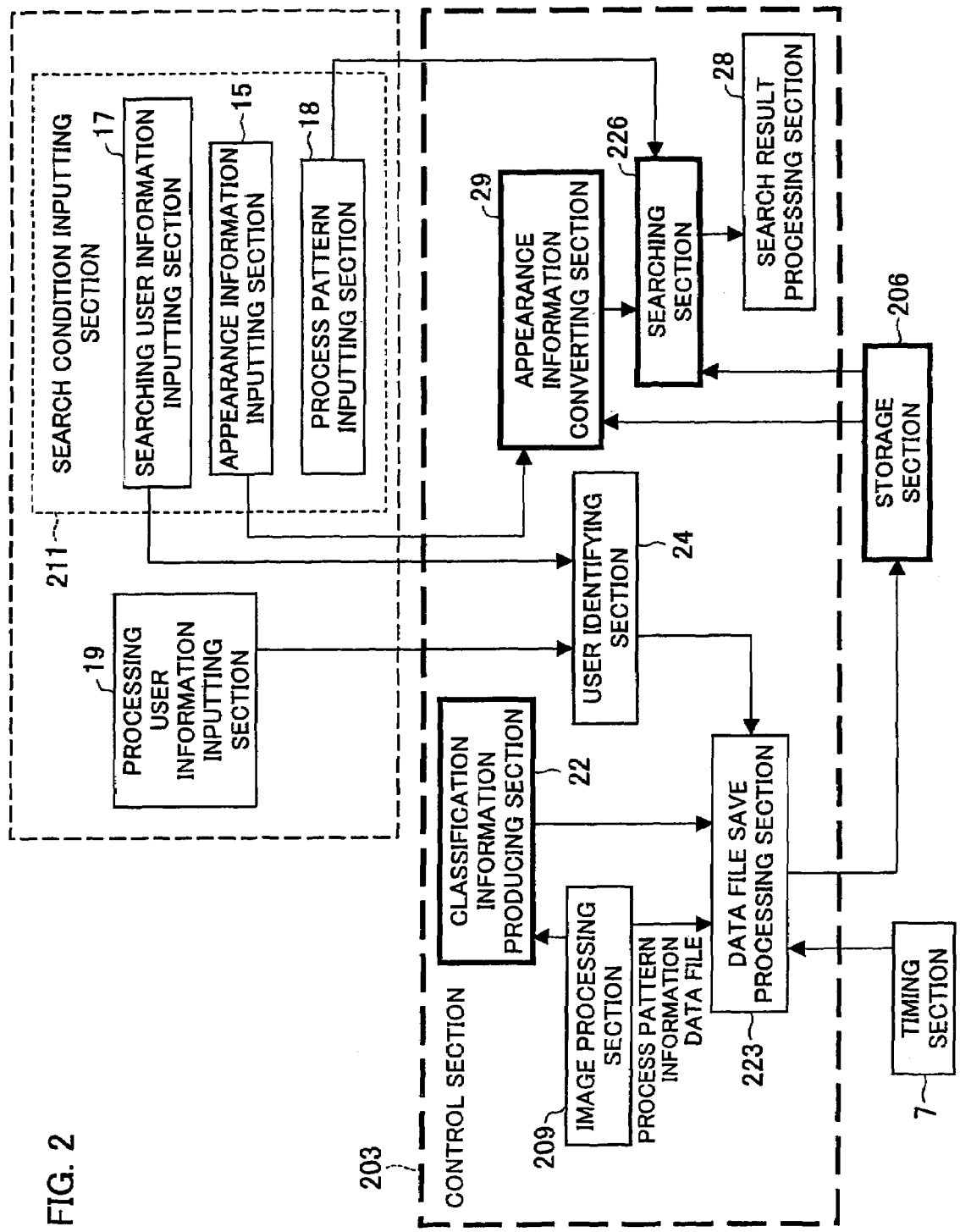
FIG. 2 is a block diagram showing an arrangement of a multifunction printer which is a partially altered version of the multifunction printer shown in FIG. 1.

FIG. 1 is a block diagram showing an arrangement of the multifunction printer 1. As shown in FIG. 1, the multifunction printer 1 (image forming apparatus) includes an image inputting section 2, a control section 3, a user interface 4 (inputting section), a display section 5, a storage section 6, a timing section 7, and an image forming section 8.

The control section 3 includes an image processing as processed documents).

The user interface 4 is composed of, for example, a liquid crystal touch panel, via which the user's instruction is inputted.

Information concerning a user who carries out copying or scanning is supplied to the processing user information inputting section 19 in the user interface 4. User information supplied to the processing user information inputting section 19 may be simply a name, a user ID, a password, or information from an IC card. In a situation of requiring higher security, biological identification information (fingerprint, iris, etc.) may be alternatively supplied.

The user inputs conditions to the search condition inputting section 11 in the user interface 4 so as to search the processed document. That is, the user inputs appearance information of the desired processed document to the appearance information inputting section 15 (inputting section). Here, user's image concerning a ratio of a text portion, a table/graph portion, and a picture (photograph, pictorial diagram, etc.) portion is supplied as the appearance information. In the case in which the processed document includes a plurality of sheets (pages), the appearance information of an arbitrary page (for example, a top page or a distinctive page) is supplied. Information concerning the user who carries out searching is inputted to the searching user information inputting section 17. As before, the user information inputted to the searching user information inputting section 17 may be simply a name, a user ID, etc. In a situation of requiring higher security, the biological identification information (fingerprint, iris, etc.) may be alternatively supplied.

The display section 5 displays a document (a plurality of possible documents) searched by control of the search result processing section 28. Note that the display section 5 may be shared with the user interface 4 (for example, liquid crystal touch panel). The storage section 6 stores data files of the processed documents together with the classification information, and/or the user information, etc. The timing section 7 provides the time on which the documents are processed, according to a request from the data file save processing section 23. The image formation controlling section 25 controls the image forming section 8 so that the to image forming section 8 carries out a printing operation or a copying operation (image formation).

The control section 3 saves the data file of the processed document in the storage section 6, in response to the image inputting section 2 and/or the user interface 4. In the case of reusing the processed document, the control section 3 searches the storage section 6 to find the data file desired by the user, and then causes the display section 5 to display the search result. Moreover, the control section 3 carries out printing of the data file specified by the user, or transmits the data file to a computer 40. Functions of the sections in the control section 3 can be realized by causing the computer to execute a program, or can be realized by hardware (For example, by causing operational means such as CPU to execute program codes stored in a recording medium such as ROM and/or RAM).

The image processing section 9 processes input data (scan input data, copy input data) supplied from the image inputting section 2, and then outputs drawing appearance information of the processed document to the appearance data generating section 21. The drawing appearance information indicates information concerning drawing appearance elements (character, ruled line, halftone dot, photograph, etc.) to which each pixel belongs. Moreover, the image processing section 9 outputs the data file of the processed document (copy document, scan document) to the data file save processing section 23.

In the copy processing section 10, the copy input data (analog), supplied from the image inputting section 2, is subjected to AD conversion, Shading, Input tone correction, Color correction, Filtering, and Half-toning in this order. Then, the copy processing section 10 outputs the data which has been thus processed to the image formation controlling section 25. Further, in the region separation processing section 31 of the copy processing section 10, the data, having been subjected to the Input tone correction, is subjected to Region separation treatment to generate the drawing appearance information, and then the drawing appearance information is outputted to the appearance data generating section 21. Moreover, the copy processing section 10 outputs the data, which has been subjected to the Input tone correction, as the data file to the file save processing section 23.

In the scan processing section 12, the scan input data (analog), supplied from the image inputting section 2, is subjected to AD conversion, Shading, Input tone correction, and Color correction in this order. Then, the scan processing section 12 outputs the data which has been thus processed to the (host) computer 40. Further, in the region separation processing section 33 of the scan processing section 12, the data, which has been subjected to Input tone correction, to Region separation treatment to generate the drawing appearance information, and then outputs the drawing appearance information to the appearance data generating section 21.

The print processing section 13 carries out a PDL conversion with respect to the data, supplied from the computer 40, and then outputs the converted data to the image formation controlling section 25. Further, the PDL analyzing section 35 of the print processing section 13 carries out a PDL analysis with respect to the data, which has been transmitted from the computer 40, to generate the drawing appearance information, and then outputs the drawing appearance information to the appearance data generating section 21.

The appearance data generating section 21 generates the appearance data according to the drawing appearance information (drawing appearance elements to which each pixel belongs) outputted from the image processing section 9. The appearance data indicates respective drawing total amounts (respective areas or the respective total numbers of pixels) of drawing appearance elements (character, ruled line, halftone dot/photograph) (that is, the appearance data indicates (i) respective areas of the character, the ruled line, and the halftone dot/photograph, or (ii) the respective total numbers of pixels of the character, pixels of the ruled line, and the pixels of the halftone dot/photograph). Here, the term "halftone dot/photograph" indicates a halftone dot or a photograph (the same is true in the following description).

According to the appearance data (respective areas of the drawing appearance elements), the classification information generating section 22 obtains a ratio of those areas (area ratio of the drawing appearance elements). Further, the area ratio of the drawing appearance elements is rounded up according to a predetermined condition (for example, the area ratio is expressed by integers from 0 to 12) to generate classification information. In the case of expressing the classification information by a ratio (6:1:12, 0:0:12, or the like) using the integers from 0 to 12, there is 2,197 (=13×13×13) combinations of classification information at the maximum. Note that the classification information generating section 22 outputs the classification information thus generated to the data file save section 23. Note also that the classification information generating section 22 may carry out weighting with respect to the area ratio of the drawing appearance elements according to a visual effect. In the case in which there is a gap due to the visual effect (optical illusion, etc) between the drawing appearance of the processed document in the use's memory and the ratio of the respective drawing total amounts of the drawing appearance elements, the above-described weighting can adjust the gap therebetween.

The user identifying section 24 identifies a user according to the user information supplied from the processing user information inputting section 19, and outputs a result (user who has carried out processing) of the identification to the data file save processing section 23. In addition, the user identifying section 24 identifies a user according to the user information supplied from the searching user information inputting section 17, and outputs a result (user who has carried out searching) of the identification to the searching section 26.

The data file save processing section 23 adds (i) the classification information supplied from the classification information generating section 22, (ii) the user information supplied from the user identifying section 24, and (iii) processed time information supplied from the timing section 7, to the data file outputted from the image processing section 9 (the copy processing section 10, the scan processing section 12, and the print processing section 13). Then, the data file save processing section 23 stores in the storage section 6 the data file to which the above-described information (i), (ii), and (iii) are added. Here, it is preferable that the data file save processing section 23 encrypt and compress the data file to save the data file in the storage section 6.

The appearance information converting section 29 refers to a conversion table stored in the storage section 6, to convert the appearance information (user's image concerning a ratio of the text portion, the table/graph portion, and the picture portion of the desired processed document), supplied from the appearance information inputting section 15, into the classification information (an area ratio of the drawing appearance elements, the area ratio being rounded up according to a predetermined condition). Then, the appearance information converting section 29 outputs this classification information to the searching section 26. The conversion table is for associating (i) a set of classification information obtained by rounding up the area ratio of the drawing appearance elements according to a predetermined condition with (ii) each appearance information. FIG. 7 shows one example of the conversion table. As shown in FIG. 7, in the case in which there are seven types of appearance information, that is, "TEXT, TABLE/GRAPH, AND PICTURE ARE SAME IN AREA", "TEXT ONLY", "TEXT IS LARGE IN AREA", "TEXT IS SMALL IN AREA", "NO TEXT", "PICTURE ONLY", and "PICTURE IS LARGE IN AREA", and the classification information is expressed by a ratio using the integers from 0 to 12 (there are 2,197 (=13×13×13) combinations of classification information at the maximum), the conversion table associates each classification information (2,197 combinations at the maximum) with any one of seven types of appearance information. That is, the classification information (4, 4, 4), (5, 3, 4), (3, 5, 4), (5, 4, 3), . . . are associated with the appearance information "TEXT, TABLE/ GRAPH, AND PICTURE ARE SAME IN AREA". Moreover, the classification information (12, 0, 0), (11, 1, 0), (11, 0, 1), (10, 1, 1), . . . are associated with the appearance information "TEXT ONLY". Note that (x, y, z) used here indicates x:y:z (x indicates drawing area of character, y is drawing area of ruled line, and z is drawing area of photograph) (the same is true in the following description). Thus, the conversion table indicates a list of classification information associated with the appearance information (there are seven types of appearance information in the above example).

The searching section 26 searches the storage section 6 to find the data file including (i) the user information of the same user (user who has processed a document) as the user (user who has carried out searching) identified by the user identifying section 24 and (ii) the classification information supplied from the appearance information converting section 29. Then, the searching section 26 outputs the search result as possible data files to the search result processing section 28. The description has assumed that the user who searches the processed document and the user who processed the processed document are the same. However, the present embodiment is not limited to this. Assuming no security problems, it may be possible to allow the user to search the document processed by others. Moreover, in the case in which there are a large number of possible (candidate) data files, the searching section 26 narrows down to the possible data files, which are processed lately (within the most recent one week, for example), according to the processed time information of the possible data file. Then, the searching section 26 outputs the possible data files thus narrowed down to the search result processing section 28.

The search result processing section 28 decrypts and extends one possible data file or a plurality of possible data files, and then causes the display section 5 to display the possible data file(s). This display is carried out in the form of a thumbnail. Note that, in the case in which one possible data file is composed of a plurality of pages, only the front page thereof is displayed. Note also that a plurality of data files may be displayed one by one. Moreover, one possible data file having a plurality of pages may be displayed page by page. Then, the search result processing section 28 outputs the data file (data file of a desired processed document), selected by the user from the possible data files, to the image formation controlling section 25.

The image formation controlling section 25 controls an image formation operation of the image forming section 8 according to the data file supplied from the copy processing section 10 or the print processing section 13 during a normal process, or according to the data file (data file selected by the user from the possible data files) supplied from the search result processing section 28 after the processed document is searched.

The following explains one method for region separation carried out by the region separation processing section 31 of the copy processing section 10 or by the region separation processing section 33 of the scan processing section 12. Needless to say, there are various methods for region separation, therefore the method for region separation by the region separation processing section 31 or 33 is not limited to the following.

First, determine a specific region including a target pixel in an input data for each color component and pixels in the vicinity of the target pixel. Then, find (i) a sum of absolute values of (a) differences between an average value of densities of the pixels in the specific region and the density of the target pixel and (b) differences between the average value of densities of the pixels in the specific region and the respective densities of peripheral pixels extracted in the specific region, and (ii) the number of peripheral pixels each having the same value of density as that of the target pixel. With this, it is determined whether the value of density of the target pixel is a local maximal value or not and is a local minimal value or not (local maximal/minimal pixel calculating step).

Next, found is a maximum value of the number of consecutive pixels in a main scanning direction or in a subordinate scanning direction from the target pixels having the local maximal value or the local minimal value in the specific region, each of the consecutive pixels each having density of not less than or not more than a reference value, the reference value being set based on the average value. The consecutive pixels constitute a run length. Then, find a complication degree which is a sum of absolute values of differences between respective densities of the peripheral pixels and the density of the target pixel (local maximal/minimal pixel peripheral information detecting step).

Based upon the run length and the complication degree obtained in the local maximal/minimal pixel peripheral information detecting step, for each color component, a pixel weight switching signal is extracted from image data and a weight ratio is counted in each region. This allows an extraction of characteristic amount of the image data (switching signal finding step). With this, it is found out whether the target pixel belongs to a character region, a halftone dot region, or a photograph region.

In the pixels within a first area including the target pixel in the image data for each color component and the pixels in the vicinity of the target pixel, black pixels are detected (color detecting step). Then, in the pixels within the first area, the number of black pixels and the number of pixels other than the black pixels are counted, respectively (counting step). Next, it is detected whether or not the target pixel drastically changes its color (edge discriminating step). Based upon output results of the color detecting step, the counting step, and the edge discriminating step, it is detected whether the target pixel belongs to a black character region or to a line drawing region.

Figure 4:
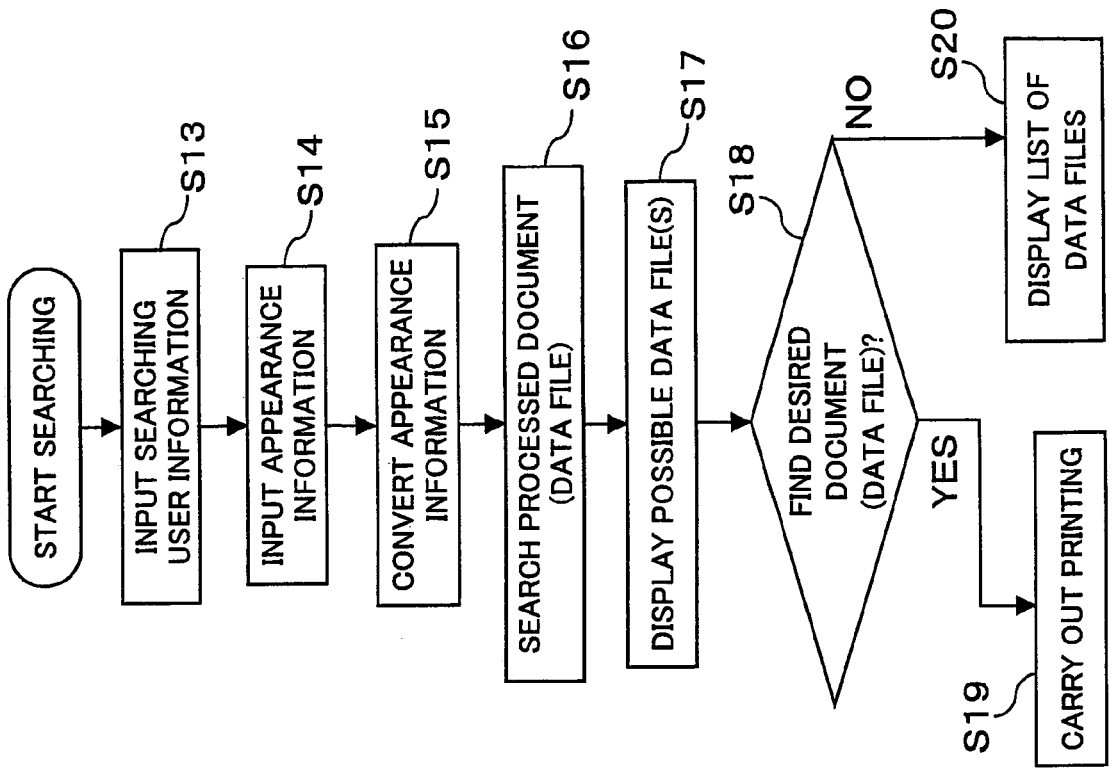
FIG. 4($a$) is a flow chart showing steps of saving a processed document in the multifunction printer.
Figure 4:
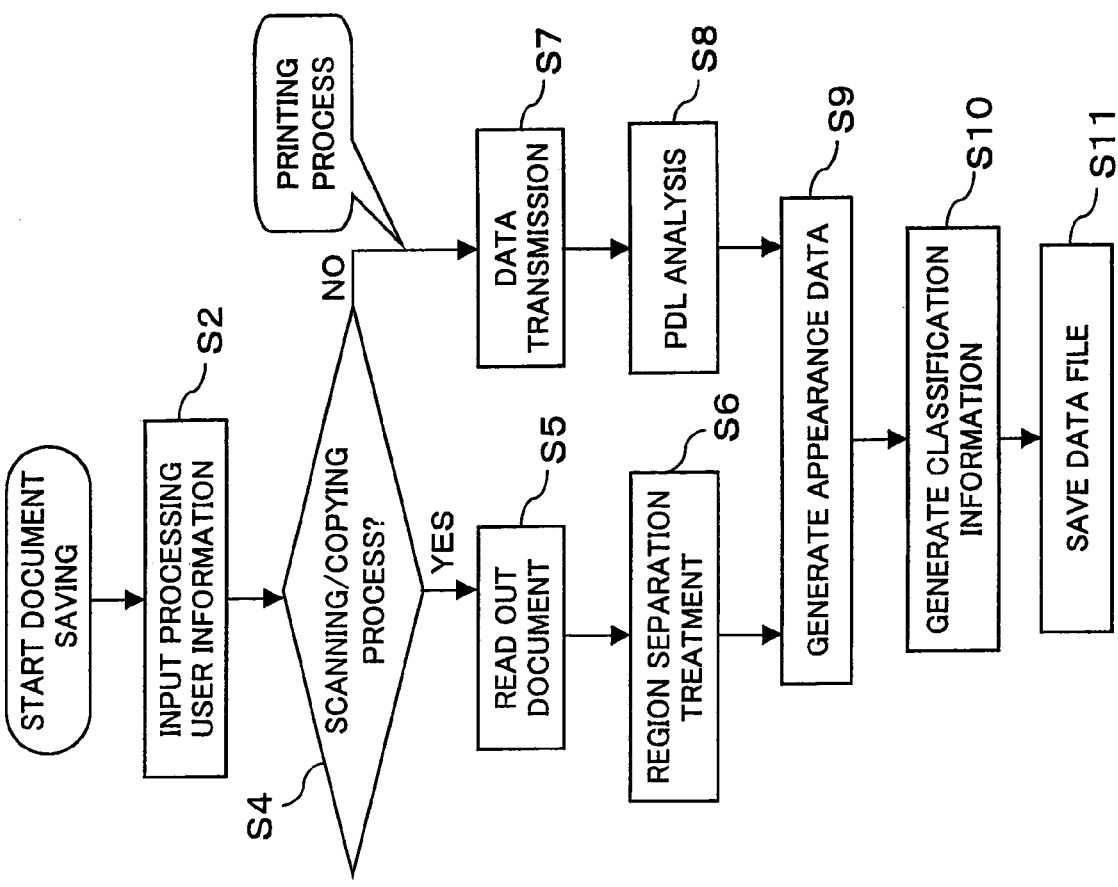

The following explains steps for saving and searching the processed document in the multifunction printer 1 in reference to FIGS. 4(*a*), 4(*b*), 6(*a*), and 6(*b*).

FIG. 4(*a*) is a flow chart showing steps of saving a document in a document processing. FIG. 6(*a*) shows notable steps in the steps of saving the processed document. Before processing the document, the user first inputs the user information (processing user information) to the processing user information inputting section 19 (S2). Then, the user starts processing the document, and carries out one of a scanning process, a copying process, and a printing process (S4).

In the case of the scanning process, the image inputting section 2 reads out the document, and then supplies scan data (analog) to the scan processing section 12 (S5). From the inputted data, the region separation processing section 31 of the scan processing section 12 recognizes the drawing appearance elements (character, ruled line, halftone dot/photograph) to which each pixel belongs (Region separation treatment, S6).

In the case of the copying process, the image inputting section 2 reads out the document, and then supplies copy data (analog) to the copy processing section 10 (S5). From the inputted data, the region separation processing section 33 of the copy processing section 10 recognizes the drawing appearance elements (character, ruled line, halftone dot/photograph) to which each pixel belongs (Region separation treatment, S6).

In the case of the printing process, for example, the (host) computer 40 supplies print data to the print processing section 13 (S7). From the inputted data, the PDL analyzing section 35 of the print processing section 13 recognizes the drawing appearance elements (character, ruled line, halftone dot/photograph) to which each pixel belongs (PDL analysis, S8).

Next, the region separation processing section 31, 33, or the PDL analyzing section 35 supplies the drawing appearance information (the drawing appearance elements to which each pixel belongs) to the appearance data generating section 21. Then, the appearance data generating section 21 generates the appearance data according to the drawing appearance information (S9, appearance data generating step). Specifically, the appearance data generating section 21 counts the total number of pixels of each drawing appearance element. By using the number, the appearance data generating section 21 generates the appearance data, that is, the appearance data generating section 21 finds the area of each drawing appearance element (character:ruled line: halftone dot/photograph) in one document (FIG. 6(*a*), S40). The classification information generating section 22 calculates the area ratio of the drawing appearance elements (FIG. 6(*a*), S41). The area ratio is rounded up under a predetermined condition by the classification information generating section 22 (FIG. 6(*a*), S42). Then, the area ratio is converted into the classification information expressed by, for example, a ratio (1:1:12, 1:0:6, etc.) using the integers from 0 to 12 (S10, classification information producing step).

The classification information generated by the classification information generating section 22 is supplied to the data file save processing section 23, and then is added to a corresponding data file together with the processed time information supplied from the timing section 7. Then, the data file including the classification information and the processed time information is saved in the storage section 6 (S11, saving step).

FIG. 4(*b*) is a flow chart showing steps of searching the processed document. FIG. 6(*b*) shows notable steps in the steps of searching the processed document. Before processing the document, the user first inputs the searching user information via the searching user information inputting section 17 (S13). Then, the user inputs the appearance information via the appearance information inputting section 15 (S14, inputting step).

FIGS. 8(*a*), 8(*b*), 8(*c*), 9(*a*), and 9(*b*) shows examples of an arrangement of a screen of the appearance information inputting section 15 (touch panel) of the present embodiment. As shown in FIG. 8(*a*), the area ratio of the drawing appearance elements (character, ruled line, and halftone dot/photograph) is displayed graphically on the screen of the appearance information inputting section 15 so that the user can easily input the user's image concerning the appearance of the processed document desired by the user. Here, three apexes A, B, and C of a hexagon are not adjacent with each other and correspond to the text, the picture, and the table/graph, respectively. Moreover, an apex D is adjacent to the apexes A and B, an apex E is adjacent to the apexes A and C, and an apex F is adjacent to the apexes B and C. A vicinity portion of the apex A (see FIG. 8(*b*)) corresponds to the document having many texts. A vicinity portion of the apex B (see FIG. 9(*a*)) corresponds to the document having many pictures. A vicinity portion of the apex C corresponds to the document having many tables/graphs. A central area G of the hexagon corresponds to the document in which the text (character), the table/graph, and the picture are arranged approximately equally. A vicinity portion of the apex D corresponds to the document having few tables/graphs. A vicinity portion of the apex E corresponds to the document having few pictures. A vicinity portion of the apex F corresponds to the document having little text (see FIG. 9(*b*)). Thus, the screen of the appearance information inputting section 15 (touch panel) includes seven regions corresponding to respective types of the appearance information. Note that the screen of the appearance information inputting section 15 may be so arranged that, as shown in FIG. 10, the text, the table/graph, and the picture correspond to the apexes of a triangle, respectively. Further, in the foregoing explanation, measures of the appearance information have been "text", "table/graph", and "picture", but the present embodiment is not limited to these. It is possible that the bases of the appearance information are simplified to "text", "picture", and "other". Moreover, a combination of the bases of the appearance information may be changed arbitrarily.

Via the appearance information inputting section 15 (touch panel) on which a graphical display is carried out in the above-described way, the user inputs the desired appearance (appearance information) of the processed document according to the user's visual judgment. For example, in the case of the document having many texts, the user touches the vicinity of the apex A area. In the case of the document in which the text (character), the table/graph, and the picture are arranged approximately equally, the user touches the vicinity of the central area G (see FIG. 8(*c*)) of the hexagon (S14).

The inputted appearance information is converted into the classification information. For example, in the case in which there is an input in the vicinity of the A area as the appearance information (in the case of the document having many texts), the appearance information is converted into the classification information, such as (12, 0, 0), (11, 1, 0), (11, 0, 1), (10, 1, 1), . . . , according to the conversion table shown in FIG. 7 (see S43 in FIG. 6(*b*)). In the case in which there is an input in the vicinity of the G area as the appearance information (in the case of the document in which the test, the table/graph, and the picture are arranged approximately equally), the appearance information is converted into the classification information, such as (4, 4, 4), (5, 3, 4), (3, 5, 4), (5, 4, 3), ..., according to the conversion table shown in FIG. 7 (S15, appearance information converting step).

In S16, a searching is carried out with respect to the storage section 6 to find the data file including (i) the classification information obtained in S15 and (ii) the user information obtained in S13 (see S44 in FIG. 6(b), searching step). The searched data files are displayed on the display section 5 as the possible data files of the processed documents desired by the user (S17, displaying step). This display is carried out in the form of the thumbnail. Note that a plurality of possible data files are displayed in chronological order. If there is the desired processed document (data file), the user selects (touches) it (S18, selecting step). Thus, the printing of the processed document is carried out (S19). If there is no desired processed document (S18), the data files of the storage section 6 are displayed in the form of a list in chronological order starting from a new data file (S20).

Note that the multifunction printer 1 may be so arranged as to be able to narrow down a search according to process pattern information (the scanning process, the copying process or the printing process). In this case, a search condition inputting section 211 is so arranged as to include the searching user information inputting section 17, the appearance information inputting section 15, and a process pattern inputting section 18. The user inputs any one of the scanning process, the copying process, and the printing process as the process pattern information, via the process pattern inputting section 18. This process pattern information is supplied to a searching section 226 (see FIG. 2). The searching section 226 searches a storage section 206 to find the data file including (i) the classification information supplied from the appearance information converting section 29, (ii) the user information supplied from the processing user information inputting section 19, and (iii) the process pattern information supplied from the process pattern inputting section 18. Then, the searching section 226 outputs the searched data file to the search result processing section 28. Note that, in this arrangement, an image processing section 209 outputs the process pattern information to a data file save processing section 223 (see FIG. 2). The data file save processing section 223 adds to the data file outputted from the image processing section 209 (i) the classification information supplied from the classification information generating section 22, (ii) the user information supplied from the user identifying section 24, and (iii) the processed time information supplied from the timing section 7. Then, the data file save processing section 223 saves in the storage section 206 the data file to which the above-described information (i), (ii), and (iii) are added (see FIG. 2).

Figure 3:
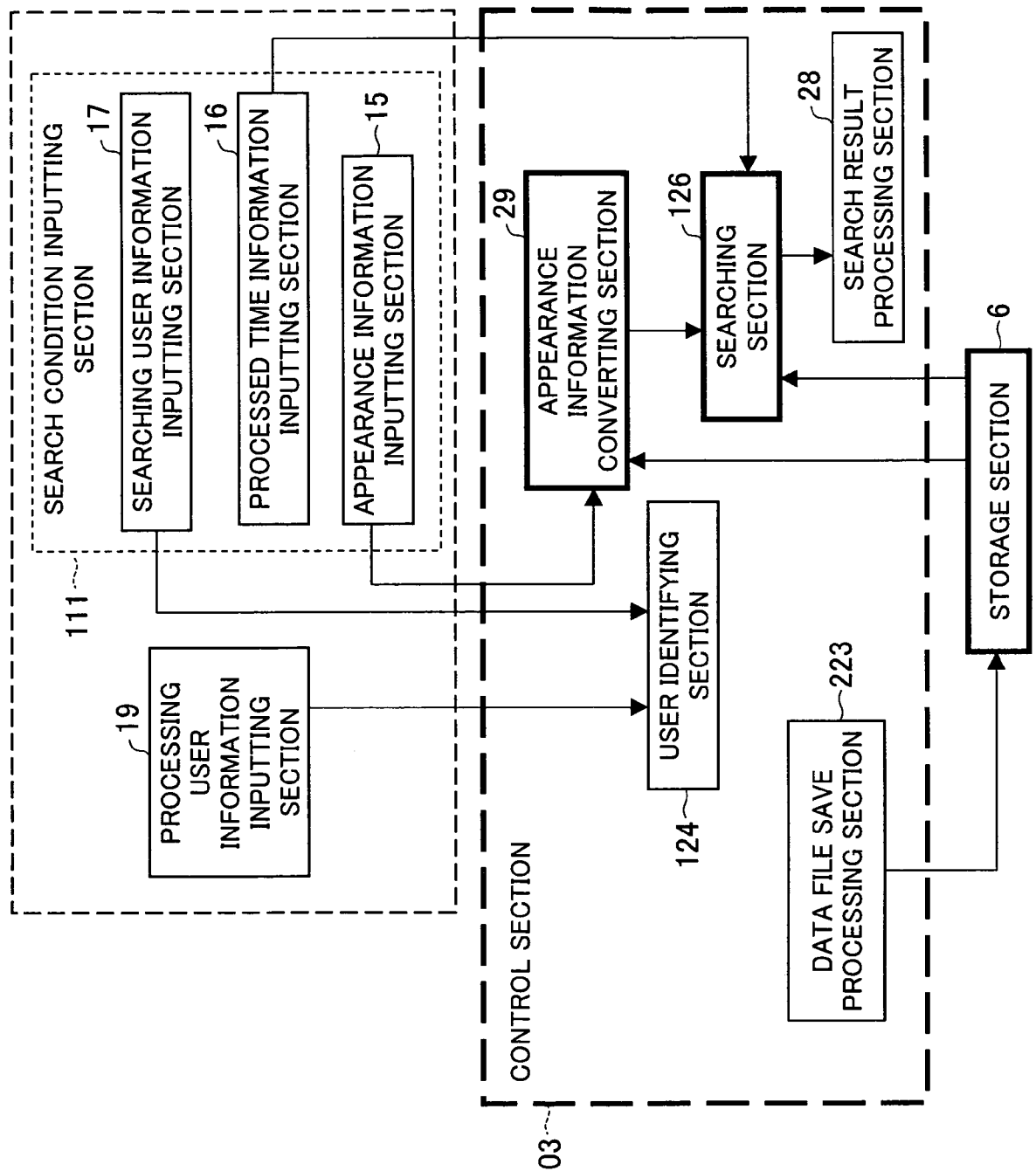
FIG. 3 is a block diagram showing an arrangement of a multifunction printer which is a partially altered version of the multifunction printer shown in FIG. 1.

Further, the multifunction printer 1 may be so arranged as to be capable of realizing a time search mode. FIG. 3 shows an arrangement capable of realizing the time search mode. In this case, a search condition inputting section 111 is so arranged as to include the searching user information inputting section 17, the appearance information inputting section 15, and a processed time information inputting section 16 (inputting section). The processed time information inputting section 16 supplies processed time information (condition) to a searching section 126 (see FIG. 3). Then, the searching section 126 searches the storage section 6 to find the data file consistent with this processed time information, and then outputs the search result to the search result processing section 28.

Figure 5:
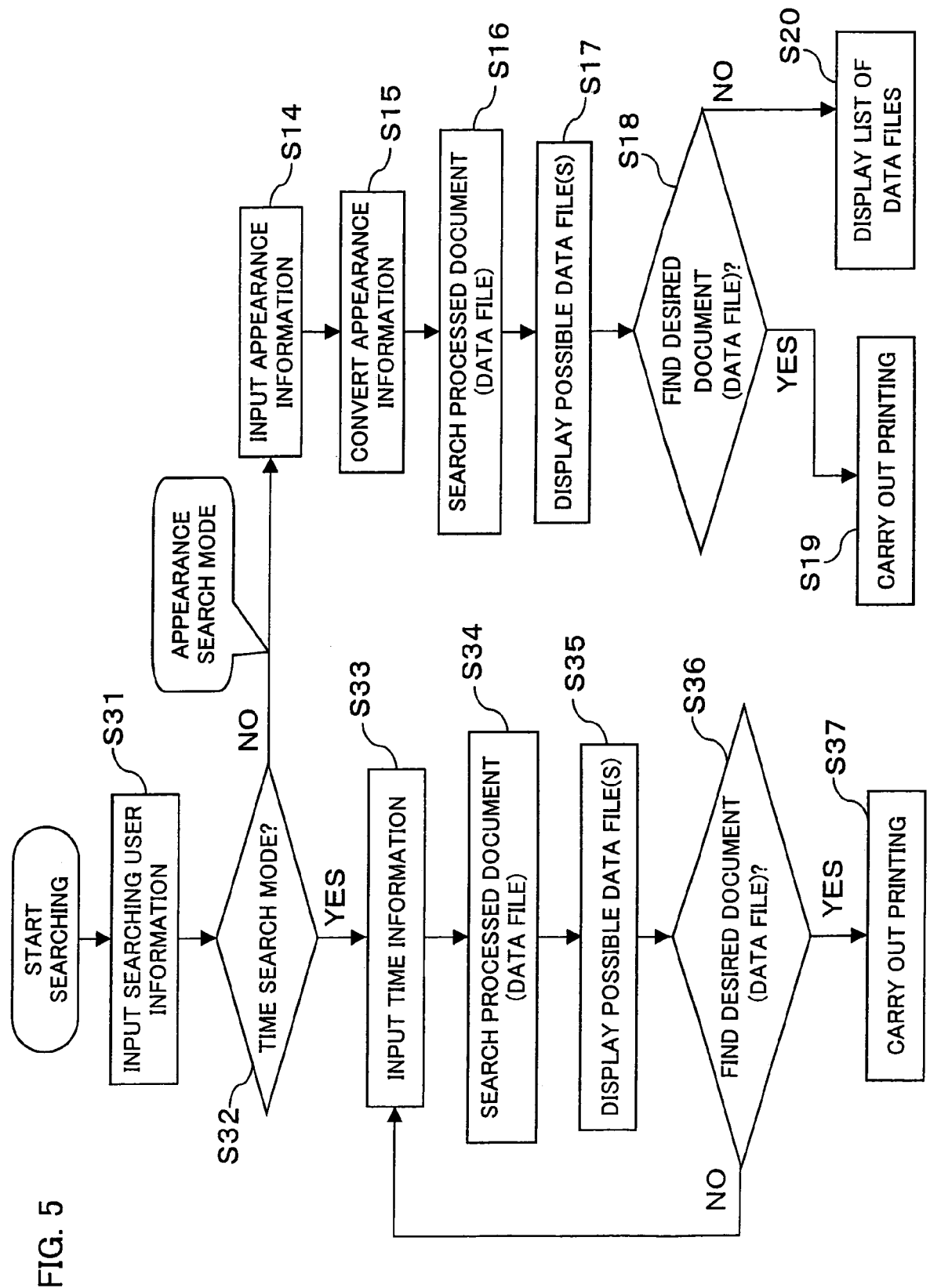
FIG. 5 is a flow chart showing a modification example of the searching steps shown in FIG. 4($b$).

FIG. 5 is a flow chart showing a processing step (time search step) in the time search mode. After the user has inputted the searching user information (S31), the user selects the time search mode (S32). Then, the user inputs the processed time information via the processed time information inputting section 16 (S33). This processed time information is information concerning a processing date and time (for example, afternoon of the day before yesterday (July 28)) in user's memory. Moreover, the processed time information inputting section 16 may be so arranged that a plurality of processed time information (for example, afternoon of the day before yesterday (July 28) and yesterday afternoon (July 29)) are inputted. The processed time information is supplied to the searching section 126 (see FIG. 3), and the searching section 126 searches the data file consistent with the processed time information (S34). The searched data file(s) is displayed on the display section 5 as the possible data file of the processed document desired by the user (S35). Note that, if there are a plurality of possible data files, these possible data files are displayed in chronological order (starting from an older data file). If there is the desired processed document (data file), the user selects (touches) it (S36). Thus, the printing of the processed document is carried out (S37). In contrast, if there is no desired processed document (S36), the inputted time information may be wrong. Therefore, the process returns to S33 to input new time information.

Note that, in the case of not selecting the time search mode, the above-described steps of searching the appearance are carried out (S14 to S20). Note also that, in the case in which there is no desired data file in S18, the process may proceed to the time search mode starting from S33.

Moreover, it is possible to combine (i) an arrangement capable of realizing the time search mode with (ii) an arrangement capable of narrowing down a search according to the process pattern information (the scanning process, the copying process, or the printing process).

The foregoing has explained about the scanner, the copy machine, and the printer. However the present embodiment is not limited to this, and is also applicable to a fax machine. In this case, it is possible to apply the present invention to search not only transmitted documents but also received documents. In addition, the foregoing has explained a case in which the present invention is applied to the multifunction printer. However, needless to say, the present invention is applicable to the scanner, the copy machine, the printer, and the fax machine, independently.

As described above, the user only has to input information based on the user's memory concerning the drawing appearance of the processed document. This inputting allows the user to pick up the data file of the desired processed document, and to reuse it. Therefore, it is possible to search the processed document easily and quickly as compared with a conventional search system in which the model document is prepared and then the processed document is searched according to the model document.

Moreover, the appearance data indicates the respective drawing total amounts of the drawing appearance elements (character, ruled line, and halftone dot/photograph). Therefore, the appearance data can be generated easily by using a result of Region separation treatment (treatment for analyzing the regions to which the pixels belong) carried out in an imaging process. As a result, it is possible to reduce load of the apparatus, the load being caused by the processed document search.

Moreover, the drawing appearance elements are the character, the ruled line, and the halftone dot/photograph. Therefore, it is possible to accurately search a processed document which is usually composed of the text, the table/graph, and the photograph/pictorial diagram.

Moreover, the classification information is obtained by rounding up the area ratio of the drawing appearance elements according to a predetermined condition. This allows a reduction in the capacity to be used in the storage section 6, as compared with a case of directly using the ratio of the respective drawing total amounts as the classification information. In addition, it is possible to carry out a quick search.

Moreover, by using the classification information obtained by carrying out the weighting with respect to the area ratio of the drawing appearance elements according to the visual effect, it is possible to adjust the gap between the drawing appearance of the processed document in the use's memory and the ratio of the respective drawing total amounts of the drawing appearance elements. This allows a more accurate search.

Moreover, the classification information generating section 22 converts the appearance information supplied by the user into the classification information in reference to the conversion table. That is, only by referring to the conversion table, it is possible to convert the appearance information into the classification information. As a result, it is possible to reduce the load of CPU, DSP, etc., the load being caused by the processed document search, and is also possible to carry out the quick search.

Moreover, the appearance information inputting section 15 is the touch panel on which the graphic display is carried out for inputting the appearance information. Therefore, the user can input the appearance information (the appearance of the processed document in the user's memory) according to the visual judgment. In this way, it is possible to reduce the load of the user, the load being caused by the search, and is also possible to simplify the search.

Moreover, the multifunction printer 1 includes the display section 5 to display the searched data file(s). Therefore, the user can check if the searched data file is the desired one, which is convenient.

Moreover, in the multifunction printer 1, the user can select the desired data file via the display section 5. Therefore, the user can select the desired data file while checking the data files, which is convenient.

Moreover, the multifunction printer 1 includes the searching user information inputting section 17, the processing user information inputting section 19, and the user identifying section 24. Therefore, it is possible to prevent unauthorized searching of the processed document, and is also possible to narrow down the search results without missing any possible data files. In this way, it becomes possible to carry out the search easily and quickly.

Moreover, in many cases, the user remembers the process pattern (copy, scan, or print) of the desired document. Therefore, by providing the processed time information inputting section 16, it becomes possible to carry out the search more easily and quickly.

Moreover, the searching section 26 can search the data file based upon the processed time of the data file. Therefore, it is possible to narrow down a plurality of researched data files to the data files processed lately (for example, within the last one week), which is convenient.

Moreover, with the arrangement capable of realizing the time search mode, in the case in which the user does not clearly remember the drawing appearance of the processed document but remembers the processed time, it is possible to search the data file according to the processed time information, which is convenient. In addition, even in the case in which there are the processed documents having similar drawing appearances, it is possible to easily search the desired document.

Note that the functions of the sections in the control section 3 (103, 203) can be achieved in the following way: (i) first, a computer-readable recording medium which stores program codes (execution program, intermediate code program, source program) of a program for searching the processed document is supplied to a system or an apparatus, and then (ii) a computer (CPU, MPU, or DSP) of the system or the apparatus executes the program codes stored in the recording medium.

In this case, the program codes themselves read out from the recording medium realizes the above-described functions. Therefore, the recording medium containing the program codes is included in the present invention.

Specifically, in the control section 3, the functions are realized in such a manner that a microprocessor (not shown) or the like executes a predetermined program stored in a memory of the storage section 6 or the like.

The recording medium for supplying the program codes can be so arranged as to be detachable from the system or the apparatus. Moreover, the recording medium may have the program codes fixedly so as to be capable of supplying the program codes. The recording medium may be loaded in the system or the apparatus so that the computer can read out the program codes in the recording medium, or the recording medium may be loaded so as to be read out by a program reader which is connected with the system or the apparatus as an external storage device.

For example, as the recording medium, it is possible to use (i) a tape, such as a magnetic tape or a cassette tape, (ii) a disc, such as a magnetic disc (a floppy® disc, a hard disc, etc.) or an optical disc (CD-ROM, MO, MD, DVD, CR-R, etc.), (iii) a card, such as an IC card (including a memory card) or an optical card, (iv) a semiconductor memory, such as a mask ROM, an EPROM, an EEPROM, or a flash ROM, (iv) or the like.

Moreover, the program codes may be recorded in the recording medium so that the computer reads out the program codes from the recording medium to directly execute the program codes or so that the program codes are transferred from the recording medium to a program storage region which is a main storage and then the computer reads out the program codes from the main storage to execute the program codes.

Further, the multifunction printer may be so arranged as to be connectable with a communication network. The program codes may be supplied through the communication network. The communication network is not limited to a specific one. Specifically, it is possible to use the Internet, an intranet, an extranet, a LAN, an ISDN, a VAN, a CATV communication network, a virtual private network, a telephone network, a mobile communication network, a satellite communication network, or the like. Moreover, a transmission medium constituting the communication network is not limited to a specific one. Specifically, it is possible to use (i) a fixed line, such as an IEEE1394, a USB, a power-line carrier, a cable TV line, a telephone line, or an ADSL line, (ii) an infrared ray, such as an IrDA or a remote control, (iii) a wireless, such as a Bluetooth®, an 802.11 wireless, an HDR, a mobile phone network, a satellite line, or a ground wave digital network. Note that the present embodiment can be realized even in the case in which the program codes are in the form of a carrier wave or a data signal row realized by an electronic transmission.

Note that a program for reading out the program codes from the recording medium to store the program codes in the main storage and a program for downloading the program codes from the communication network are stored in advance in the system or the apparatus so that those programs can be executed by the computer.

The functions of the control section 3 are realized by executing the program codes read out by the computer, and are also realized by causing an OS running on the computer to carry out part of or all processes according to instructions of the program codes.

Further, the functions of the control section 3 can be realized in the following manner: the program codes read out from the recording medium are written to a memory provided on a function expansion board mounted in a computer or on a function expansion unit connected to the computer, and then a CPU or the like provided in the function expansion board or the function expansion unit carries out part of or all processes according to the instructions of the program codes.

Thus, according to an image processing apparatus of the present invention, the user can pick up the data file of the desired processed document only by inputting the rough memory of the drawing appearance of the processed document. This allows the searching of the processed document easily and quickly, as compared with a conventional search system in which a model document is prepared and then the processed document is searched according to the model document.

Moreover, it is preferable that the appearance data indicates the respective drawing total amounts (the respective total numbers of pixels or the respective drawing areas) of the drawing appearance elements (for example, the character, the halftone dot, and the photograph). According to the above arrangement, the appearance data can be generated easily by using a result of Region separation treatment (treatment for analyzing the regions to which the pixels belong) carried out in the imaging process. As a result, it is possible to reduce the load of the apparatus (CPU, DSP, etc.), the load being caused by the processed document search.

Moreover, it is preferable that the drawing appearance elements include the character, the halftone dot, and the photograph. Generally, most of the documents are composed of the text and/or the photograph/pictorial diagram. On this account, by using the character, the halftone dot, and the photograph as the drawing appearance elements, it becomes possible to carry out the search more accurately. Note that it is possible to further include the ruled line as the drawing appearance element. In this case, it becomes possible to accurately search the document including the table/graph.

It is preferable that the classification information be obtained by rounding up the ratio of the respective drawing total amounts of the drawing appearance elements, according to a predetermined condition. By rounding up the ratio of the respective drawing total amounts of the drawing appearance elements (for example, by obtaining rough approximations of the respective drawing total amounts of the drawing appearance elements to obtain the ratio expressed by the integers from 0 to a predetermined integer), it is possible to reduce the recording capacity of the storage section, as compared with a case of using the ratio of the respective drawing total amounts as the classification information. In addition, it becomes possible to carry out the quick search.

Moreover, the classification information is characterized in that it is obtained by weighting the ratio of the respective drawing total amounts of the drawing appearance elements, based on the visual effect. In some cases, there is a gap due to the visual effect (optical illusion, etc.) between the drawing appearance of the processed document in the use's memory and the ratio of the respective drawing total amounts of the drawing appearance elements. According to the above arrangement, it is possible to adjust the gap therebetween. On this account, it is possible to carry out the search more accurately. Note that the classification information may be obtained by (i) carrying out the weighting with respect to the ratio of the respective drawing total amounts of the drawing appearance elements according to the visual effect, and then (ii) rounding up the weighted ratio.

Moreover, it is preferable that the storage section include the conversion table for associating the appearance information, supplied from the inputting section, with the classification information, so that the appearance information converting section converts the appearance information into the classification information in reference to the conversion table. According to the above arrangement, the appearance information can be converted into the classification information only by referring to the conversion table. As a result, it becomes possible to reduce the load of the apparatus, the load being caused by the processed document search, and becomes also possible to carry out the quick search. One concrete example of the conversion table lists the rounded-up ratios of the respective drawing total amounts of the drawing appearance elements for each appearance information.

Moreover, it is preferable that the inputting section be a touch panel on which a graphical display is carried out for inputting the appearance information. According to the above arrangement, the user can input the appearance information (the appearance of the processed document in user's memory) according to the visual judgment, via the inputting section. In this way, it is possible to reduce the user's burden during the search, and is also possible to simplify the search.

Moreover, it is preferable that the image processing apparatus include the display section for displaying the searched data file(s). The arrangement is convenient for the user because the user can check if the searched data file is the desired one.

Moreover, in the present embodiment, it is preferable that the desired data file can be selected via the display section. According to the above arrangement, in the case in which there are a plurality of searched data files, the user can select the desired data file, while checking those data files, which is convenient.

Moreover, it is preferable that (i) the image processing apparatus further include the user identifying section, so that the saving section saves in the storage section the data file of the processed document together with the result obtained from the user identifying section, and (ii) the searching section search the data file according to the result obtained from the user identifying section. The user identifying section is exemplified by a password inputting section, an IC card reader section, a finger print recognition section, or the like.

According to the above arrangement, it is possible to prevent unauthorized searching of the processed document, and is also possible to narrow down the search results without missing any possible data files. In this way, it becomes possible to carry out the search easily and quickly.

It is preferable that (i) the inputting section be capable of receiving the process pattern information, (ii) the saving section save in the storage section the data file of the processed document together with the process pattern of the data file, and (iii) the searching section search the data file according to the process pattern information supplied from the inputting section. Most users remember the process pattern (copy, scan, or print) of the desired document. Therefore, by using the process pattern information, it is possible to carry out the search more easily and quickly.

It is preferable that (i) the image processing apparatus further include the timing section, so that the saving section saves in the storage section the data file of the processed document together with the processed time, and (ii) the searching section search the data file according to the processed time of the data file. According to the above arrangement, it becomes possible to narrow down a plurality of data files to the data files which are processed lately (for example, within the most recent one week), which is convenient.

Moreover, it is preferable that (i) the inputting section is capable of receiving the processed time information, (ii) it be possible to select the time search mode based on this processed time information, and (iii) in the time search mode, the searching section search the storage section to find the processed document consistent with the processed time information.

According to the above arrangement, in the case in which the user does not clearly remember the drawing appearance of the processed document but remembers the processed time, it is possible to search the data file according to the processed time, which is convenient.

Moreover, an image forming apparatus of the present embodiment is characterized by including the image processing apparatus.

Moreover, a method for searching a processed document of the present embodiment is characterized by including the steps of: generating appearance data according to a drawing appearance of a processed document; producing classification information of the processed document from the appearance data; saving in a storage section a data file of the processed document together with the classification information of the data file; receiving an input of appearance information of the processed document desired by a user; converting the appearance information into the classification information to output the classification information; and, searching the storage section to find the data file of the processed document consistent with the outputted classification information.

Moreover, the above-described method is characterized by further including the steps of: displaying the searched data file(s) in the searching step; and, selecting the data file, desired by the user, from the displayed data file(s).

Moreover, in the converting step, it is preferable that the appearance information be converted into the classification information in reference to the conversion table.

Moreover, in the saving step of the above-described method, it is preferable that (i) the data file of the processed document be saved with processed time information, and (ii) in a case of not being able to select the data file, desired by the user, in the selecting step, a step of searching the storage section to find the processed document consistent with the processed time information be carried out.

Moreover, a program for searching the processed document of the present embodiment is characterized by causing a computer to execute the above steps.

Moreover, the program for searching the processed document of the present embodiment is characterized by being stored in the computer in a computer-readable manner.

An image processing apparatus of the present embodiment is widely applicable to the printer, the copy machine, the fax machine, the scanner, and the multifunction printer.

The present invention is not limited to the embodiments above, but may be altered within the scope of the claims. An embodiment based on a proper combination of technical means disclosed in different embodiments is encompassed in the technical scope of the present invention.

What is claimed is:

1. An image processing apparatus comprising:
    an appearance data generating section for generating appearance data according to a drawing appearance of a processed document, the appearance data representing respective drawing total amounts of drawing appearance elements of the processed document;
    a classification information producing section for producing, by obtaining a ratio of the respective drawing total amounts of the drawing appearance elements from the appearance data, classification information which is for classifying the processed document;
    a saving section for saving a data file of the processed document in a storage section together with the classification information of the data file;
    an inputting section to which appearance information of the processed document desired by a user is inputted;
    an appearance information converting section for converting the appearance information into the classification information and then outputting the classification information; and
    a searching section for searching the storage section to find the data file of the processed document consistent with the outputted classification information,
    wherein the classification information being obtained, by weighting the ratio of the respective drawing total amounts of the drawing appearance elements, based on a visual effect, so that a gap due to the visual effect between the drawing appearance of the processed document in the use's memory and the ratio of the respective drawing total amounts of the drawing appearance elements is adjusted.

2. The image processing apparatus as set forth in claim 1, wherein the appearance data indicates respective areas of the drawing appearance elements.

3. The image processing apparatus as set forth in claim 2, wherein the drawing appearance elements include a character, a halftone dot, and a photograph.

4. The image processing apparatus as set forth in claim 2, wherein the classification information is obtained by rounding up the ratio of the respective drawing total amounts of the drawing appearance elements, according to a predetermined condition.

5. The image processing apparatus as set forth in claim 1 comprising a conversion table in the storage section for associating the appearance information of the processed document with the classification information, the appearance information being supplied from the inputting section,
    the appearance information converting section converting the appearance information of the processed document into the classification information in reference to the conversion table.

6. The image processing apparatus as set forth in claim 5, wherein the conversion table lists rounded-up ratios of the respective drawing total amounts of the drawing appearance elements for each appearance information of the processed document.

7. The image processing apparatus as set forth in claim 1, wherein the inputting section is a touch panel on which a graphical display is carried out for inputting the appearance information.

8. The image processing apparatus as set forth in claim 1 comprising a display section for displaying the searched data file(s).

9. The image processing apparatus as set forth in claim 8, wherein the desired data file can be selected via the display section.

10. The image processing apparatus as set forth in claim 1 further comprising a user identifying section,
    the saving section saving in the storage section the data file of the processed document together with a result obtained from the user identifying section, and the searching section searching the data file according to the result obtained from the user identifying section.

11. The image processing apparatus as set forth in claim 1, wherein
the inputting section is capable of receiving an input of process pattern information,
the saving section saves in the storage section the data file of the processed document together with a process pattern of the data file, and
the searching section searches the data file according to the process pattern information supplied from the inputting section.

12. The image processing apparatus as set forth in claim 1 further comprising a timing section,
the saving section saving in the storage section the data file of the processed document together with a processed time obtained from the timing section, and the searching section searching the data file according to the processed time of the data file.

13. The image processing apparatus as set forth in claim 12, wherein
the inputting section is capable of receiving processed time information,
it is possible to select a time search mode based on the processed time information, and
in the time search mode, the searching section searches the storage section to find the processed document consistent with the processed time information.

14. An image forming apparatus comprising the image processing apparatus as set forth in claim 1.

15. A method for searching a processed document, comprising the steps of:
generating appearance data according to a drawing appearance of a processed document, the appearance data representing respective drawing total amounts of drawing appearance elements of the processed document;
producing, by obtaining a ratio of the respective drawing total amounts of the drawing appearance elements, classification information of the processed document from the appearance data;
saving in a storage section a data file of the processed document together with the classification information of the data file;
receiving an input of appearance information of the processed document desired by a user;
converting the appearance information into the classification information to output the classification information; and,
searching the storage section to find the data file of the processed document consistent with the outputted classification information,
wherein the classification information being obtained, by weighting the ratio of the respective drawing total amounts of the drawing appearance elements, based on a visual effect, so that a gap due to the visual effect between the drawing appearance of the processed document in the use's memory and the ratio of the respective drawing total amounts of the drawing appearance elements is adjusted.

16. The method as set forth in claim 15 further comprising the steps of:
displaying the searched data file(s) in the searching step; and,
selecting the data file, desired by the user, from the displayed data file(s).

17. The method as set forth in claim 15, wherein in the converting step, the appearance information is converted into the classification information in reference to a conversion table.

18. The method as set forth in claim 15, wherein
in the saving step, the data file of the processed document is saved with processed time information, and
in a case of not being able to select the data file, desired by the user, in the selecting step, a step of searching the storage section to find the processed document consistent with the processed time information is carried out.

19. A computer readable storage medium storing a computer executable program for searching a processed document, the program causing a computer to execute the steps of: generating appearance data according to a drawing appearance of the processed document, the appearance data representing respective drawing total amounts of drawing appearance elements of the processed document; producing classification information of the processed document by obtaining a ratio of the respective drawing total amounts of the drawing appearance elements of the processed document from the appearance data, wherein the classification information being obtained, by weighting the ratio of the respective drawing total amounts of the drawing appearance elements, based on a visual effect, so that a gap due to the visual effect between the drawing appearance of the processed document in the use's memory and the ratio of the respective drawing total amounts of the drawing appearance elements is adjusted; saving in a storage section a data file of the processed document together with the classification information of the data file; receiving an input of appearance information of the processed document desired by a user; converting the appearance information into the classification information to output the classification information; and, searching the storage section to find the data file of the processed document consistent with the outputted classification information.

* * * * *